United States Patent
Baptist et al.

(10) Patent No.: US 12,270,680 B2
(45) Date of Patent: Apr. 8, 2025

(54) SYSTEM AND METHOD FOR VERSION-ADAPTIVE NAVIGATION SERVICES

(71) Applicants: Harman Becker Automotive Systems Gmbh, Karlsbad (DE); Bayerische Motoren Werke Aktiengesellschaft, Munich (DE)

(72) Inventors: Stefan Baptist, Eichenau (DE); Hans-Joerg Peter, Munich (DE); Benjamin Quattelbaum, Munich (DE); Michael Westphal, Rechtmehring (DE)

(73) Assignees: Harman Becker Automotive Systems GmbH, Karlsbad (DE); Bayerische Motoren Werke Aktiengesellschaft, Munich (DE)

( * ) Notice: Subject to any disclaimer, the term of this patent is extended or adjusted under 35 U.S.C. 154(b) by 219 days.

(21) Appl. No.: 17/838,677

(22) Filed: Jun. 13, 2022

(65) Prior Publication Data
US 2022/0397418 A1    Dec. 15, 2022

Related U.S. Application Data

(60) Provisional application No. 63/210,320, filed on Jun. 14, 2021.

(51) Int. Cl.
*G01C 21/00* (2006.01)
*G01C 21/34* (2006.01)

(52) U.S. Cl.
CPC ....... *G01C 21/387* (2020.08); *G01C 21/3461* (2013.01); *G01C 21/3885* (2020.08)

(58) Field of Classification Search
CPC ............ G01C 21/387; G01C 21/3461; G01C 21/3885; G01C 21/3804
See application file for complete search history.

(56) References Cited

U.S. PATENT DOCUMENTS

| | | | | |
|---|---|---|---|---|
| 9,158,672 | B1 * | 10/2015 | Zheng ................ | G06F 12/023 |
| 9,794,165 | B1 * | 10/2017 | Wood .................. | H04L 45/125 |
| 11,405,272 | B1 * | 8/2022 | Khan .................. | H04L 41/0895 |
| 2011/0231087 | A1 * | 9/2011 | Johnson ............. | G01C 21/3461 |
| | | | | 701/533 |
| 2012/0130944 | A1 * | 5/2012 | Masuda ............. | G01C 21/3878 |
| | | | | 707/E17.01 |
| 2013/0013557 | A1 * | 1/2013 | Kunath .............. | G01C 21/26 |
| | | | | 707/E17.005 |
| 2014/0188386 | A1 * | 7/2014 | Obara ................. | G01C 21/26 |
| | | | | 701/532 |
| 2016/0162478 | A1 * | 6/2016 | Blassin ............. | G06Q 10/063112 |
| | | | | 706/12 |
| 2016/0275131 | A1 * | 9/2016 | Lublinsky ......... | G06F 16/29 |
| 2017/0222912 | A1 * | 8/2017 | Atkinson .......... | H04L 45/128 |
| 2018/0143975 | A1 * | 5/2018 | Casal ................. | G06F 40/51 |
| 2020/0370903 | A1 * | 11/2020 | Rolf .................. | G06F 16/9537 |

(Continued)

*Primary Examiner* — Jason Holloway
*Assistant Examiner* — Madison B Emmett
(74) *Attorney, Agent, or Firm* — Angela M. Brunetti

(57) ABSTRACT

A system and method for translating route guidance between a navigation system and a navigation service when different versions of a map database are being used. The navigation service applies a version translation table to identify differences between the map databases and translates route guidance accordingly before it is communicated to the navigation system.

3 Claims, 7 Drawing Sheets

(56) References Cited

U.S. PATENT DOCUMENTS

| | | | |
|---|---|---|---|
| 2020/0370907 A1* | 11/2020 | Cajias | G01C 21/3885 |
| 2020/0370918 A1* | 11/2020 | Rolf | G06F 16/29 |
| 2021/0381847 A1* | 12/2021 | Cajias | G09B 29/106 |
| 2022/0214188 A1* | 7/2022 | Wegner | G01C 21/3889 |

* cited by examiner

SYSTEM AND METHOD FOR VERSION-ADAPTIVE NAVIGATION SERVICES

CROSS REFERENCE

This application claims the benefit of U.S. Provisional Application Ser. No. 63/210,320 filed Jun. 14, 2021, the disclosure of which is incorporated in its entirety by reference.

TECHNICAL FIELD

The present disclosure relates to navigation databases and more particularly, to version-adaptive navigation services when database versions differ.

BACKGROUND

Navigation systems perform activities based on databases that specify underlying, physical road networks. These databases are typically configured to associate data with road segments via link identifiers, hereinafter referred to as link IDs.

Traditionally, a database is used by a closed system, for example, a vehicle head unit or a location-based cloud service. When an update is performed, it is done within the system and no other system is affected. More recently, there is a trend toward a service-oriented environment, for which different systems are connected to each other and sharing databases between systems is required. However, when using navigation map databases on two physically separated systems exchanging road segment information there exists the possibility that road segments are represented differently in each database. In this situation the systems cannot successfully exchange data structures unless both systems have performed the same update.

This may be addressed by updating map databases over the air. However, the network bandwidth required is not always guaranteed, and it may be expensive to implement. Another approach is to use identifier-independent referencing of road segments through techniques such as open standard, for example, OpenLR. However, this approach requires application of sophisticated routing algorithms on an end user's side and may, from the end user's perspective, lead to delays, glitches, and mismatches in route guidance.

A need exists for a system and method that translates the numeric road identifiers between map databases.

SUMMARY

A navigation system and method having a local navigation database in use by a local navigation system. A user-input destination is communicated to an external navigation service for route calculation. Upon calculating the route at the external navigation service using an external navigation database, a version translation table is applied. The version translation table compares a version of the local navigation database with the external navigation database to identify any road segments present in the external navigation database that are not present in the local navigation database and blocks any road segments that are identified. The route is translated, at the external navigation database, using only the local navigation database as derived by applying the translation table. The translated route is communicated to the local navigation system and presented to a user.

In one or more embodiments, the external navigation service is physically separated from the local navigation system.

In one or more embodiments, the external navigation service is cloud-based.

In one or more embodiments, the version translation table is updated incrementally so that a most recent version of the local navigation database is considered with a most recent version of the external navigation database.

In one or more embodiments, an alternative route to a route calculated at the local navigation system is requested by local navigation system. The locally calculated route is communicated to the external navigation service where it is reverse-translated by applying the version translation table. An alternative route is calculated using the external navigation database. The alternative route is translated by applying the version translation table a second time, so as to be translated for the local navigation system.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to the figures, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Figure 1:
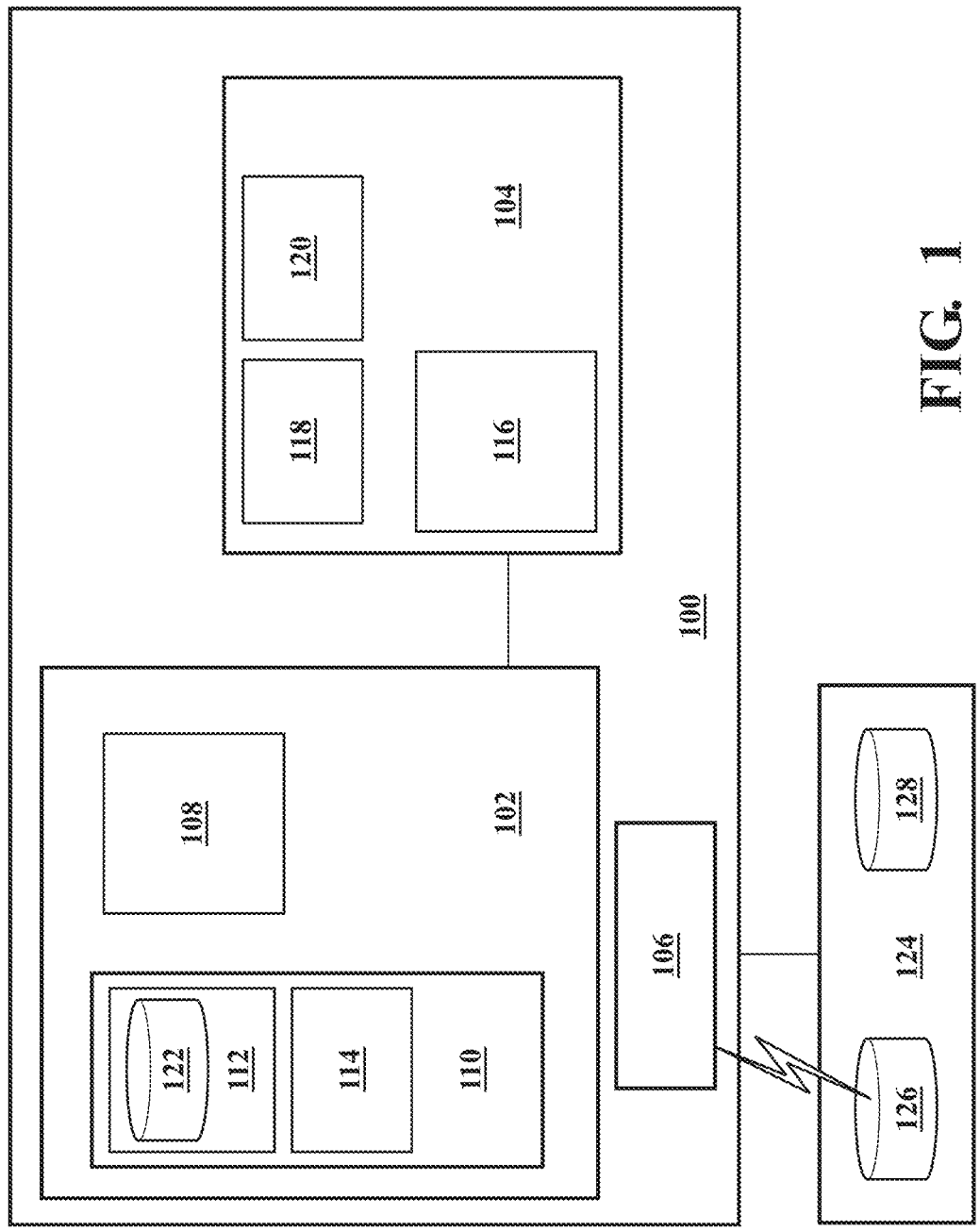
FIG. 1, is a block diagram of a navigation system in communication with a navigation service.

FIG. 1 is a block diagram of a navigation system 100 according to one example of an implementation of the inventive subject matter. The navigation system 100 has a navigation computer 102, a human-machine interface 104, and a communication unit 106. The navigation computer 102 has a processor 108 and storage 110. Storage 110 is an electronic memory component that stores information, including data 112 and instructions for the processor 108. Storage 110 may be fixed, or removable and may be local or remote. The storage 110 may also provide an operating system 114. Data 112 includes a local navigation database 122 that carries map data and information identifying a version of the database that is in use by the navigation system 100.

The human-machine interface 104 enables user interaction with the navigation computer 102 and may include a display 116, a speech input device 118, and tactile input devices 120 such as a computer, keyboard, touchscreen, or other device that allows the user to interact with the navigation computer 102. The communication unit 106 may include a wireless wide-area network (WAN) or other connection.

The navigation system 100 may communicate with an external navigation service 121 that has a navigation database 126. The navigation database 126 also carries map data and version information identifying a version of the database that is in use by the external navigation system 126. The external navigation service 124 is physically separated from the navigation system 100 and may, for example, be cloud-based. The external navigation service 124 may communicate with the navigation system 100 over the communication unit 106.

In practice, the navigation databases 122, 126 may be updated at different times, the result being each of the navigation system 100 and the navigation service 124 may be using different versions of a database which may cause an interruption in the ability to share map data between the navigation system 100 and the external navigation service 124. When different versions of the databases 122, 126 exist, a version translation table 128 is used by one of navigation system 100 or navigation service 124. In the example shown in FIG. 1, the version translation table 128 is situated with the external navigation service 124 because, being cloud-based, it is most likely to have the most recent version of the database. The version translation table 128 is applied to a calculated route to translate a set of road segments that are connected to each other in one map database to a set of road segments in the other database. Therefore, when different versions of the databases 122 and 126 are present, the navigation service 124 applies the version translation table 128 to a calculated route and translates the route guidance information for the navigation system 100. The navigation service 124, using the version translation table 128, identifies road segments that are present in the latest database version 126 but are not present in the version of the database 122 being used by the navigation system 100. With the version translation table 128 applied, the navigation service 124 actively avoids any road segments missing from the navigation system database 122 during route guidance processing.

Figure 2:
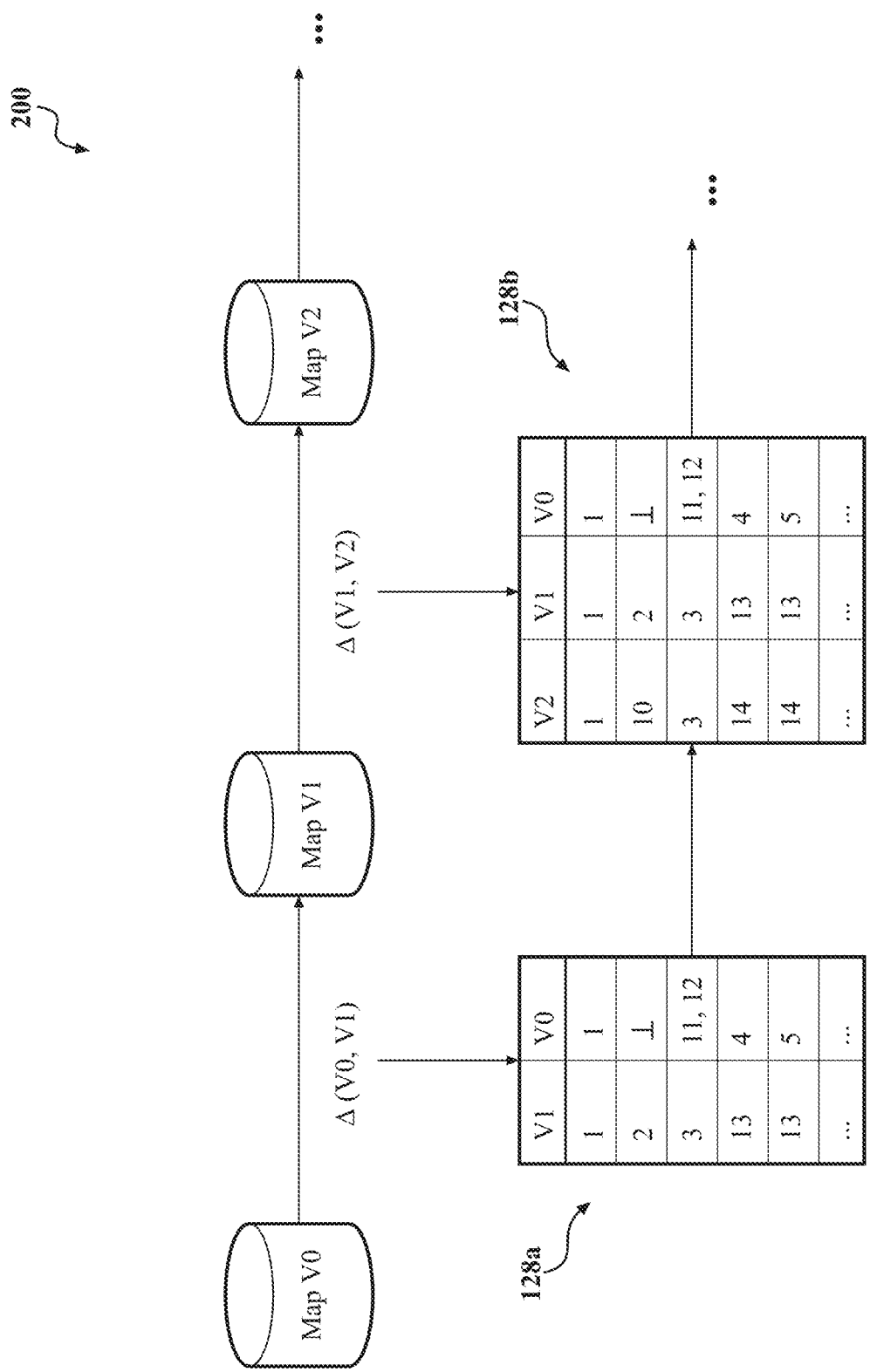
FIG. 2 is a block diagram depicting version translation tables.

FIG. 2 is a block diagram 200 of example version translation tables for map database versions, V0, V1, and V2. The version translation table 128 links IDs in the most recent database version to their equivalents in previous database versions. The version translation table is initially created, using comparing and matching algorithms, to detect different representations of the same road segments (link IDs). The matching algorithms ensure consistency of the translated road segments. When, in one map database, a set of road segments are connected to each other, their translated representations are also connected to each other in the other map database.

The version translation table is updated incrementally. For example, version translation table 128a shows the difference in road segments, or link IDs, between map V0 and map V1. Link 1 in V0 translates to link 1 in V1, link 2 in V1 is not present in V0 and therefore it is blocked, ⊥, and won't be used for calculating a route. Link 3 in V1 translates to links 11 and 12 in V0, link 4 in V0 translates to link 13 in V1, and link 5 in V0 also translates to link 13 in V1.

Only differences in the most recent previous version of a database are considered. For example, in the version translation table 128b with most recent database version V2, there is no change to link "1" in any of the versions V0, V1 or V2. Link 10 in V2 translates to link 2 in V1, which is blocked, ⊥, in V0 because it is not present in the V0 database. Link 14 in V2 translates to link 13 in V1, which translates to links 4 and 5 in V0.

Figure 3A:
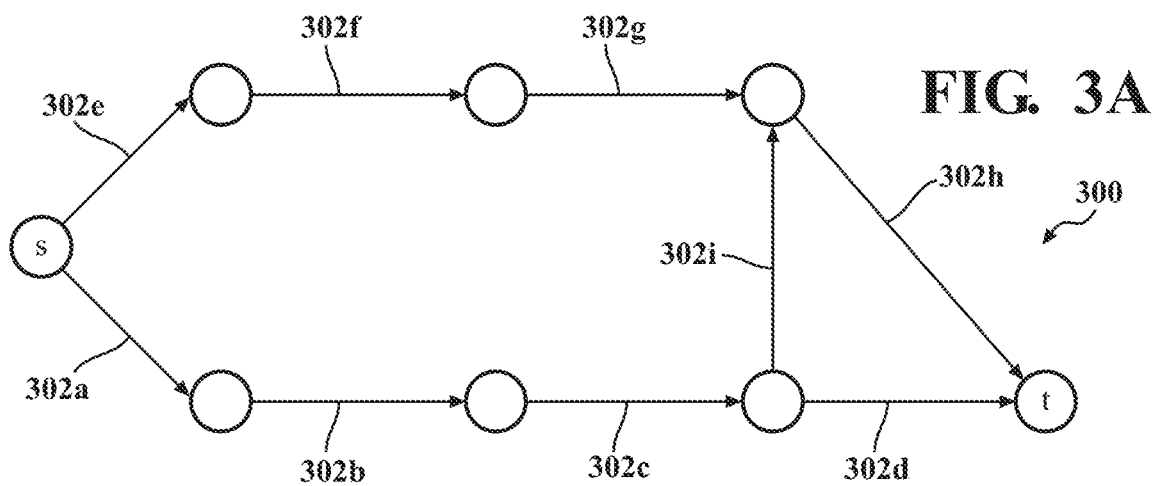
FIG. 3A is an example of a road network.
Figure 3B:
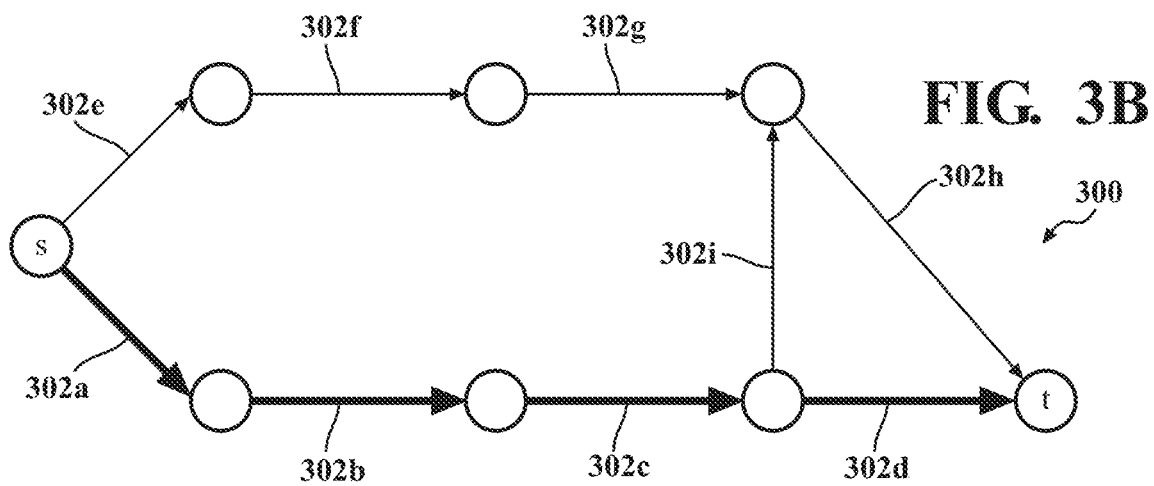
FIG. 3B is an example of a route in the road network.
Figure 3C:
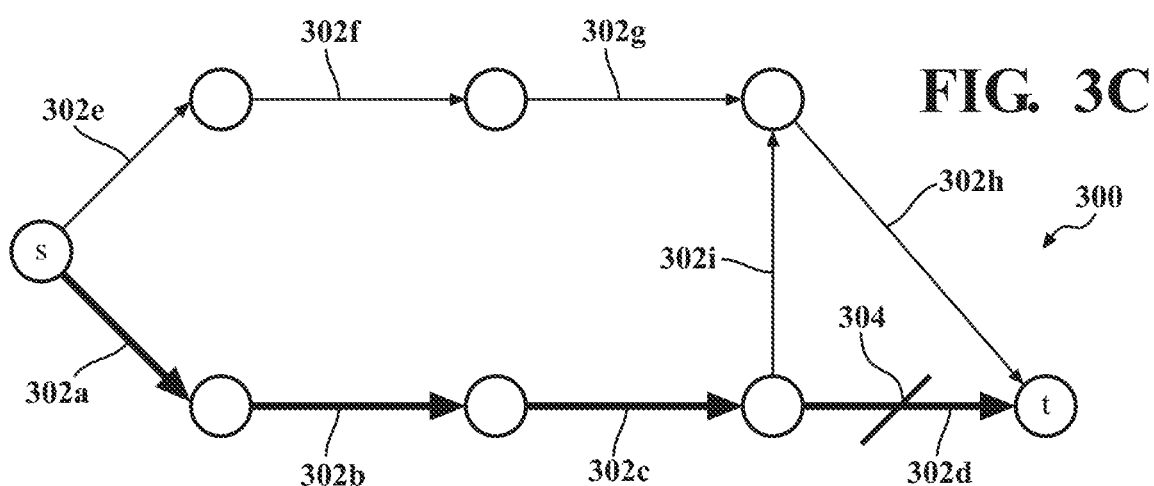
FIG. 3C is an example of a route in the road network.
Figure 3D:
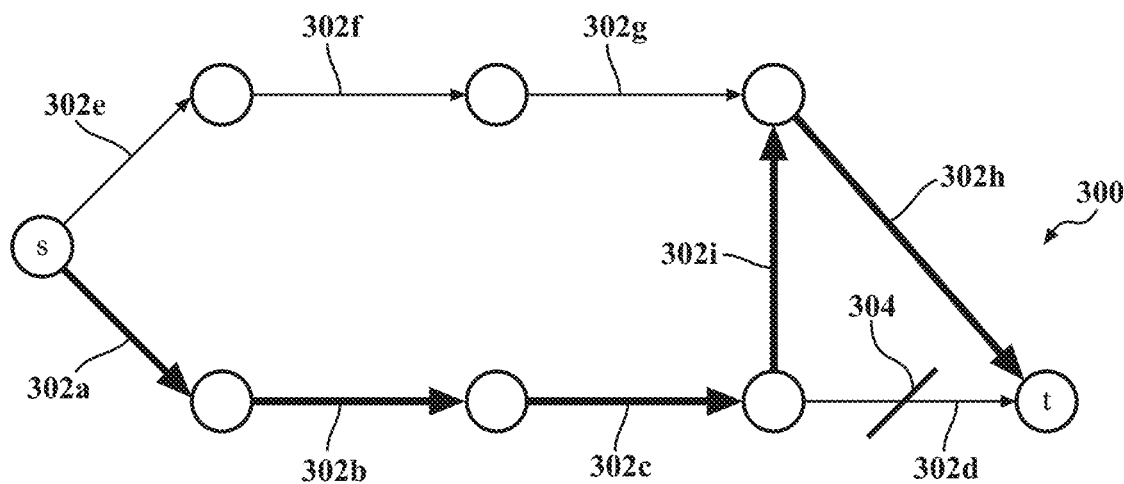
FIG. 3D is an example of a route in the road network.

FIGS. 3A, 3B, 3C, 3D and 3E shows a road network 300 and will be used to describe how a local route adjustment is made to avoid suboptimal route guidance for a route between "s" and "t" when the navigation system and the navigation service have differing versions of map databases. FIG. 3A links road segments 302a, 302b, 302c, 302d, 302e, 302f, 302g, 302h, 302i, that are available in a road network 300 between points "s" and "t". FIG. 3B depicts, by bold arrows, an optimal route that is generated by the navigation service using the most recent version of a database, i.e., the database for the cloud-based navigation service. The optimal route uses road segments 302a, 302b, 302c, and 302d. FIG. 3C depicts, by the hashmark 304, a road segment 302e that is not included in one of the databases, i.e., the database version being currently in use by the navigation system 100. The absence of the road segment 302d requires the navigation system recalculate (or rewrite by way of translation) the route for the navigation system.

In prior art systems, the route would be re-calculated by the navigation system according to the most recent database information without applying the translation table. Such a re-calculated (yet untranslated) route is shown, by bold arrows, in FIG. 3D. The recalculated (yet untranslated) route uses road segments 302a, 302b, 302c, 302i, and 302h. The route is clearly suboptimal, and from the user's perspective it appears as a glitch.

Figure 3E:
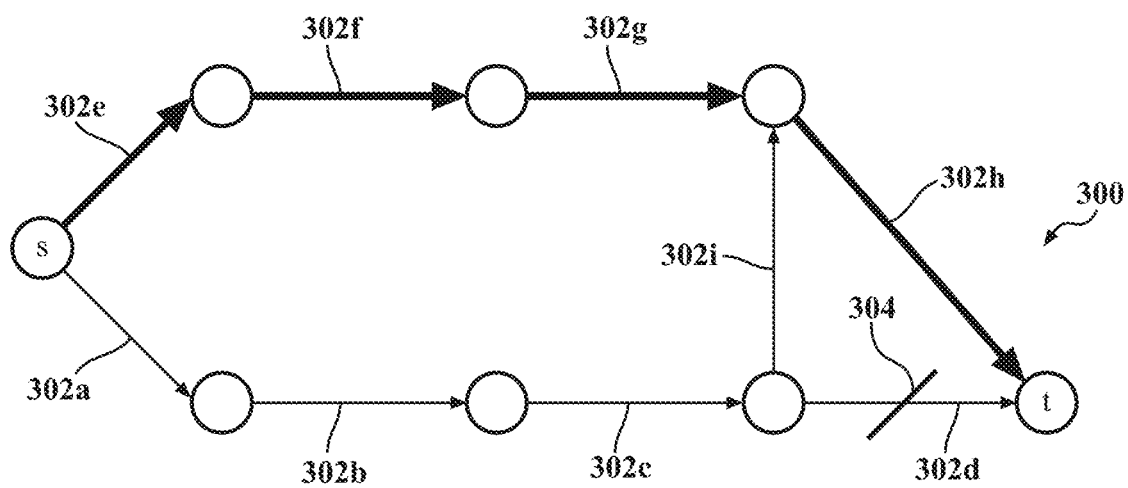
FIG. 3E is an example of a route in the road network determined according to a method of the inventive subject matter.

FIG. 3E is the route that is calculated by the external navigation service 124, when the route is calculated by the navigation service using the most recent database version and then applying the version translation table. Applying the version translation table allows the navigation service to translate the route using the database version that is currently being used by the local navigation system 100. Effectively, the external navigation service 124 selects a version of the database from the translation version table that matches the database version identified by the local navigation system 100 and immediately translates the calculated route using the database version of the local navigation system. The result is the navigation services sends the route, shown in bold arrows 302e, 302f, 302g, 302h, that may not be the most efficient based on the latest road data in its own database version but is known to be the most reliable for the version of the database present on the local navigation system 100. In this regard, the local navigation system 100 can rely on the fact that the route is valid, and each link is accurately connected.

Figure 4:
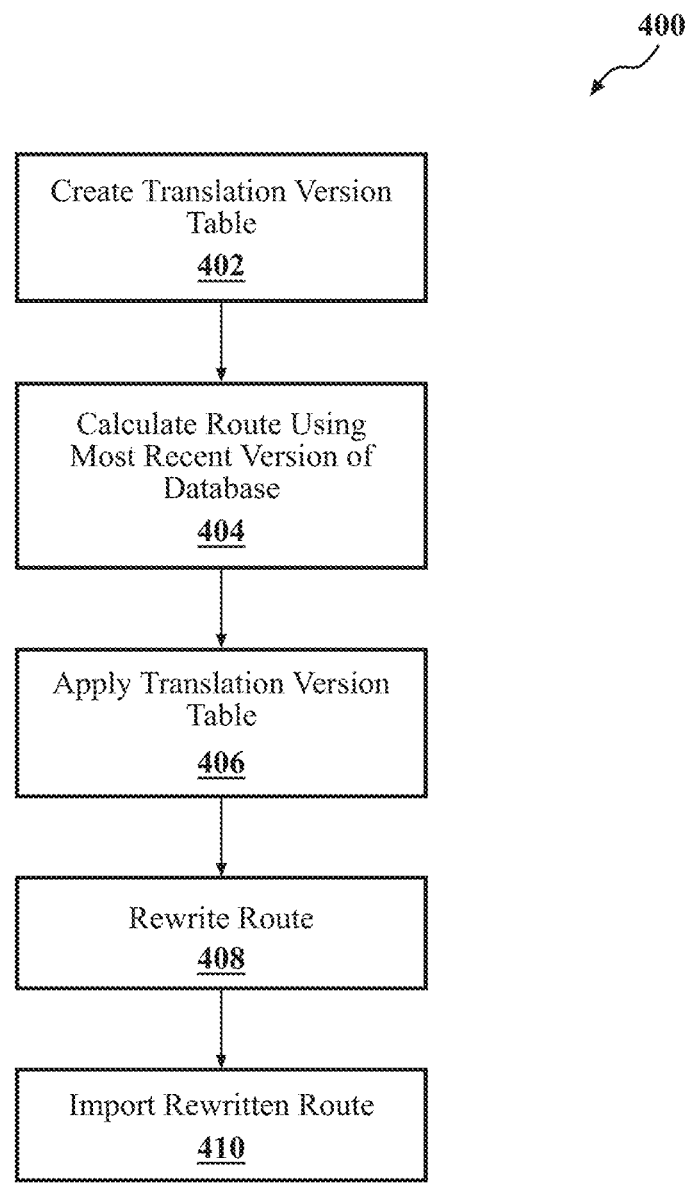
FIG. 4 is a flow chart of a method of the inventive subject matter.

FIG. 4 is a flowchart for a method 400 for version-adaptive routing for a navigation system having one database version communicating with a navigation service having a different database version. A version translation table is created 402. The version translation table is link-based and is created by mapping recent link IDs for a recent database version to link IDs for an outdated database version. Further, links that cannot be mapped in the outdated database version are blocked and will be excluded by the navigation service when the route is rewritten.

A route is calculated 404 based on the most recent database version but excludes blocked links. The version translation table is applied 406 to the calculated route and the route is rewritten 408 to match the outdated database version being used at the navigation system. The rewritten route is then imported 410 to the local navigation system. The rewritten route is guaranteed to match a sequence of connected links in the outdated version of the database being used by the local navigation system.

Figure 5:
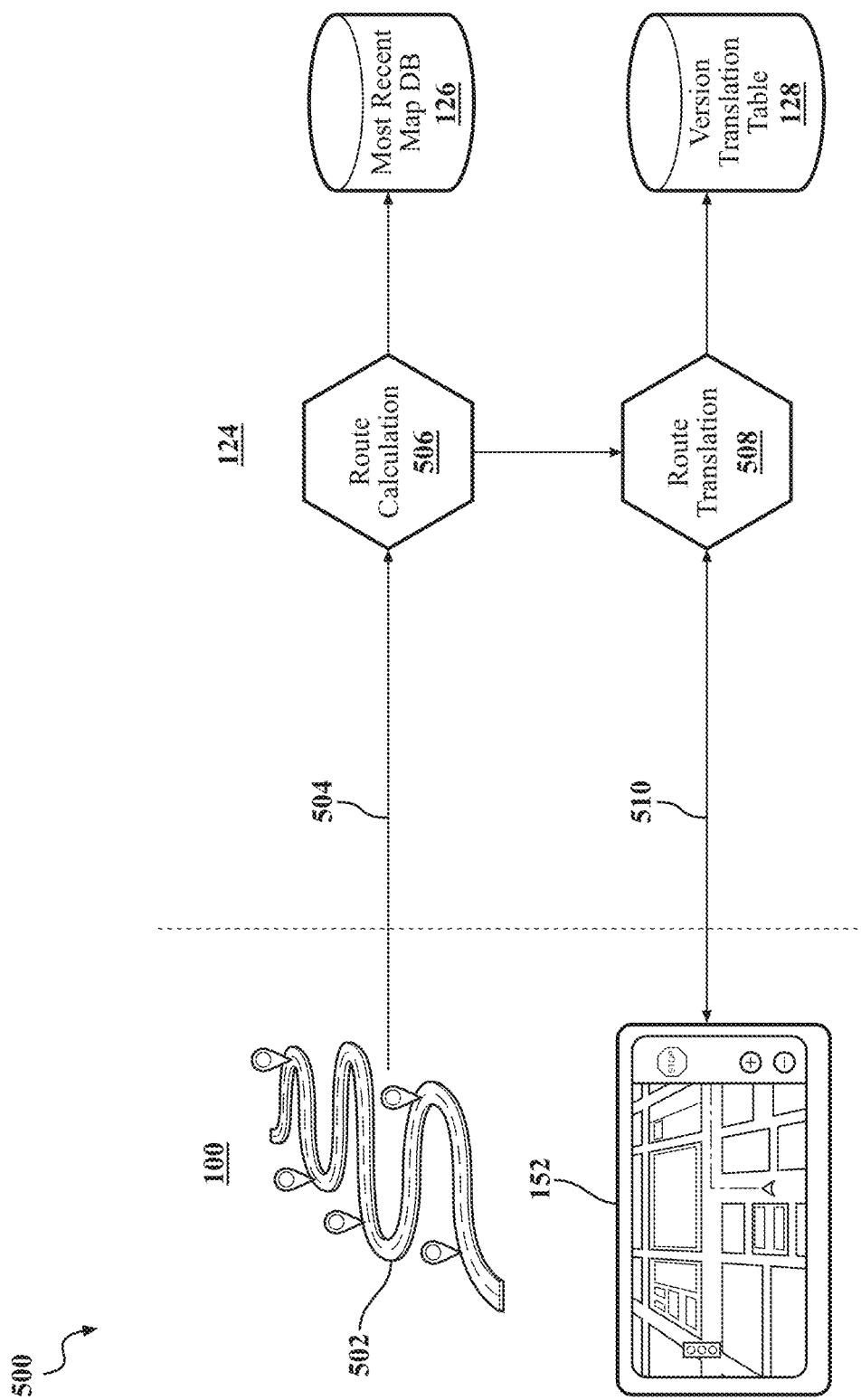
FIG. 5 is a flow diagram of a method of the inventive subject matter.

In one or more embodiments shown in FIG. 5, the flow diagram 500 depicts a scenario for which the user inputs waypoints for an online route calculation of a route destination 502 by way of the human machine interface at the navigation system 100, for example a navigation system in a vehicle head unit. A route calculation request 504 is communicated to the cloud-based navigation service 124. When the navigation service 124 calculates 506 the route, it uses the most recent database version 126 available to the cloud-based navigation service 124. To make the calculated route compatible with the, potentially outdated, map database at the navigation system 100, the route is translated 508. The version translation table 128 is applied to the calculated route and the route is rewritten to ensure that the calculated route uses map data that is available in the version of the database being used at the navigation system 100. The route calculation request 504 includes information identifying the current version of the database (not shown) that is being used by the navigation system 100 at the user-end, therefore this information is available to the navigation service and route may be translated accordingly. The translated route is communicated 510 to the navigation system 100. The translated route communicated 510 to the navigation system is guaranteed, by construction, to be compatible with the, potentially outdated, map database at the navigation system 100. Therefore, the route can be immediately imported at the navigation system 100 for visualization and route guidance 152.

Figure 6:
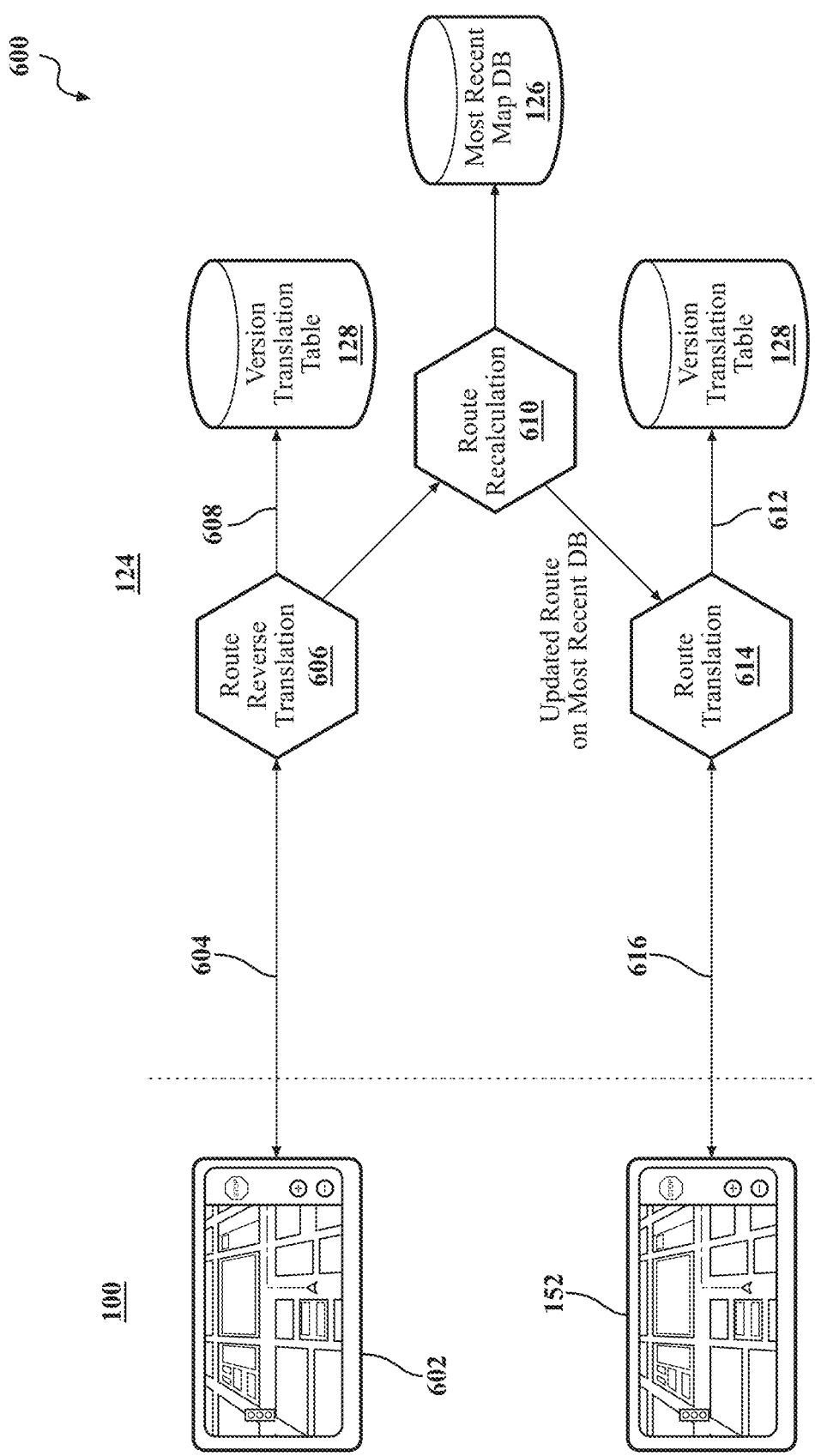
FIG. 6 is a flow diagram of a method of the inventive subject matter.

In one or more embodiments shown in a flow diagram 600 in FIG. 6, the navigation system 100 requests an alternative route 602 to its currently guided route. The navigation system 100 communicates 604 the request for an alternative 602 to the navigation service 124, which request also includes the current route in the form of a sequence of link IDs to the navigation server 124. Given that the route 602 may have been calculated by the navigation system 100 using a potentially outdated map database, it is initially reverse translated 606 so that it matches the most recent map database 126 by applying 608 the version translation table 128. The reverse-translated route is now considered compatible with the most recent map data and is considered by the navigation system 100 to calculate 610 the alternative route. The version translation table 128 is again applied 612 to the updated alternative route to translate 614 the alternative route to be compatible with the database version at the navigation system 100. The translated alternative route is communicated 616 back to the navigation system 100 and visualized 152.

In this example, the interpolation between links is connecting the latest database information available at the navigation service with the outdated database information available at the navigation system. The links connected in the most recent database version are also connected in the other (outdated) database version to ensure consistency of translated segments.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order, may be executed repeatedly, and are not limited to the specific order presented in the claims. Additionally, the components and/or elements recited in any apparatus claims may be assembled or otherwise operationally configured in a variety of permutations and are accordingly not limited to the specific configuration recited in the claims. Any method or process described may be carried out by executing instructions with one or more devices, such as a processor or controller, memory (including non-transitory), sensors, network interfaces, antennas, switches, actuators to name just a few examples.

Benefits, other advantages, and solutions to problems have been described above regarding embodiments; however, any benefit, advantage, solution to problem or any element that may cause any particular benefit, advantage, or solution to occur or to become more pronounced are not to be construed as critical, required, or essential features or components of any or all the claims.

The terms "comprise", "comprises", "comprising", "having", "including", "includes" or any variation thereof, are intended to reference a non-exclusive inclusion, such that a process, method, article, composition, or apparatus that comprises a list of elements does not include only those elements recited but may also include other elements not expressly listed or inherent to such process, method, article, composition, or apparatus. Other combinations and/or modifications of the above-described structures, arrangements, applications, proportions, elements, materials, or components used in the practice of the present disclosure, in addition to those not specifically recited, may be varied, or otherwise particularly adapted to specific environments, manufacturing specifications, design parameters or other operating requirements without departing from the general principles of the same.

What is claimed is:

1. A method for version-adaptive routing for a navigation system having a first database version communicating with an external navigation system having a second, more recent, database version, the method is carried out in a processor having a non-transitory computer-readable medium, the method comprises the steps of:
    mapping link identifiers from the second, more recent, database version with link identifiers from the first database version;
    generating a version translation table by identifying and blocking link identifiers in the second, more recent, database version, that cannot be mapped to link identifiers in the first database version;
    calculating a route, at the external navigation system, using the second, most recent, database version;
    applying, at the external navigation system, the version translation table to the calculated route;
    rewriting, at the external navigation system, the calculated route with the version translation table applied to exclude blocked link identifiers; and
    importing the rewritten calculated route from the external navigation system to the navigation system having the first database.

2. The method as claimed in claim 1, further comprising the step of incrementally updating the version translation table to ensure that only a most recent previous version of the first database is considered with the second, more recent, database version.

3. The method as claimed in claim 1, wherein the steps of applying the version translation table and rewriting the calculated route further comprises the steps of:
   selecting, at the external navigation system, a version of the database from the translation table that matches the first database version; and
   rewriting the calculated route using the version of the database that matches the first database version.

\* \* \* \* \*